United States Patent [19]

Sugiyama et al.

[11] Patent Number: 4,980,208
[45] Date of Patent: Dec. 25, 1990

[54] METHOD FOR TREATING THE SURFACE OF AN OXYGEN PERMEABLE HARD CONTACT LENS

[75] Inventors: Akihisa Sugiyama; Tatsutoshi Nakajima; Yoshitaka Taniyama, all of Nagoya, Japan

[73] Assignee: Menicon Company, Ltd., Nagoya, Japan

[21] Appl. No.: 515,704

[22] Filed: Apr. 27, 1990

[30] Foreign Application Priority Data

Jun. 14, 1989 [JP] Japan ................................. 1-151307

[51] Int. Cl.$^5$ ............................................. B05D 3/06
[52] U.S. Cl. ...................................... 427/444; 427/39; 427/296; 427/322
[58] Field of Search ................... 427/444, 39, 296, 322

[56] References Cited

U.S. PATENT DOCUMENTS

| | | | |
|---|---|---|---|
| 3,925,178 | 12/1975 | Gesser et al. | 204/165 |
| 4,214,014 | 7/1980 | Hofer et al. | 427/40 |
| 4,409,258 | 10/1983 | Feurer et al. | 427/38 |

FOREIGN PATENT DOCUMENTS

| | | |
|---|---|---|
| 51-42553 | 4/1976 | Japan . |
| 55-49288 | 12/1980 | Japan . |
| 57-122417 | 7/1982 | Japan . |
| 58-27937 | 6/1983 | Japan . |
| 58-43015 | 9/1983 | Japan . |
| 60-39089 | 9/1985 | Japan . |
| 62-37370 | 8/1987 | Japan . |

*Primary Examiner*—Bernard Pianalto
*Attorney, Agent, or Firm*—Oblon, Spivak, McClelland, Maier & Neustadt

[57] ABSTRACT

A method for treating the surface of an oxygen permeable hard contact lens, which comprises applying high-frequency glow discharge treatment to an oxygen permeable hard contact lens made of a copolymer consisting essentially of a silicone-containing (meth)acrylate and/or a fluorine-containing (meth)acrylate, in a gas atmosphere of at least one member selected from the group consisting of helium, neon, argon and nitrogen gas, containing substantially no oxygen.

5 Claims, No Drawings

4,980,208

METHOD FOR TREATING THE SURFACE OF AN OXYGEN PERMEABLE HARD CONTACT LENS

BACKGROUND OF THE INVENTION

1. Field of the Invention

The present invention relates to a method for treating the surface of an oxygen permeable hard contact lens. More particularly, it relates to a method for treating the surface of an oxygen permeable hard contact lens to give good water-wetting properties to the surface of the oxygen permeable hard contact lens.

2. Discussion of Background

In recent years, oxygen permeable hard contact lenses made essentially of a silicone-containing (meth)acrylate and/or a fluorine-containing (meth)acrylate, have attracted an attention as hard contact lenses having excellent oxygen permeability and hardness simultaneously.

Such oxygen permeable hard contact lenses have practically satisfactory oxygen permeability and hardness as well as hydrophilic properties of the surface. However, in order to more sufficiently provide the performance as contact lenses, it is desired to further improve the affinity with tears i.e. the water-wetting properties.

As a method of giving water-wetting properties to contact lenses, it has been proposed to apply plasma treatment to the contact lenses in an oxygen-containing atmosphere to give hydrophilic properties, as disclosed in e.g. U.S. Pat. No. 4,214,014. However, such a method has a drawback that when it is employed, the material of the contact lenses tends to deteriorate and becomes brittle.

SUMMARY OF THE INVENTION

Under these circumstances, the present inventors have conducted extensive researches to develop a method for treating the surface of an oxygen permeable hard contact lens, whereby no deterioration of the material will be brought about, and the oxygen permeability and hardness can be maintained even when the treatment for giving the hydrophilic properties to the contact lens surface is applied. It has been surprisingly found for the first time that when high-frequency glow discharge is applied to the above mentioned oxygen permeable hard contact lens in a gas atmosphere of at least one member selected from the group consisting of helium, neon, argon and nitrogen gas i.e. a so-called inert gas containing substantially no oxygen, hydrophilic properties can be given while the intrinsic properties specific to the contact lens can be maintained. The present invention has been accomplished on the basis of this discovery.

Thus, the present invention provides a method for treating the surface of an oxygen permeable hard contact lens, which comprises applying high-frequency glow discharge treatment to an oxygen permeable hard contact lens made of a copolymer consisting essentially of a silicone-containing (meth)acrylate and/or a fluorine-containing (meth)acrylate, in a gas atmosphere of at least one member selected from the group consisting of helium, neon, argon and nitrogen gas, containing substantially no oxygen.

DETAILED DESCRIPTION OF THE PREFERRED EMBODIMENTS

The contact lens to be treated by the surface treatment method of the present invention, is an oxygen permeable hard contact lens made of a copolymer which is composed essentially of a silicone-containing (meth)acrylate and/or a fluorine-containing (meth)acrylate, which, as mentioned above, has attracted an attention in recent years as a contact lens which can be continuously worn. With respect to the size and thickness of such a contact lens, there is no particular restriction. A contact lens of any size and thickness may be treated by the method of the present invention so long as it is of the type normally worn on an eye.

In the present invention, the atmosphere for the high frequency glow discharge treatment is a gas atmosphere of at least one member selected from the group consisting of helium, neon, argon and nitrogen gas, which contains substantially no oxygen. The reason why such an atmosphere should not contain oxygen, is that if the treatment is conducted in the presence of oxygen, the contact lens tends to be brittle. Among the above mentioned gases helium, neon and argon are particularly preferred, since they do not deteriorate the lens material even when the treatment is applied to the contact lens surface for a long period of time. The pressure of the gas atmosphere is usually within a range of from 0.01 to 5.0 Torr.

Referring to an example of the conditions for the high-frequency glow discharge treatment, the frequency for the high-frequency glow discharge is, for example, usually about 13.56 MHz, and the discharge output is usually from 10 to 1,000 W. The discharge treating time is usually from 10 seconds to 20 minutes. However, it should be understood that the present invention is not limited to such specific conditions.

The surface treatment method of the present invention is conducted by means of a reduced pressure container having an inlet for introducing an inert gas such as helium, neon, argon or nitrogen gas and an evacuating means to evacuate the container to a predetermined reduced pressure level. A contact lens is mounted between an anode and a cathode, the container is then maintained under a predetermined reduced pressure state, and then predetermined high frequency glow discharge treatment is applied between the anode and the cathode. The contact lens with its surface thus treated, has hydrophilic properties given while the oxygen permeability and the hardness of the contact lens itself are maintained.

Now, the method for treating the surface of an oxygen permeable hard contact lens according to the present invention will be described in further detail with reference to Examples. However, it should be understood that the present invention is by no means restricted to such specific Examples.

In the following Examples, "parts" means "parts by weight" unless otherwise specified.

EXAMPLE 1

As the oxygen permeable hard contact lens, a contact lens (hereinafter referred to simple as CL-A) composed of 35 parts of tris(trimethylsiloxy)silylpropyl methacrylate, 40 parts of trifluoroethyl methacrylate, 5 parts of methyl methacrylate and 6 parts of ethylene glycol dimethacrylate, a contact lens (hereinafter referred to simply as CL-B) composed of 45 parts of tris(trimethylsiloxy)silylpropyl methacrylate, 40 parts of trifluoroethyl methacrylate, 4 parts of methyl methacrylate, 5 parts of methacrylic acid and 6 parts of ethylene glycol dimethacrylate, or a contact lens (hereinafter referred to simply as CL-C) composed of 60 parts of tris(trimethylsiloxy)silylpropyl methacrylate, 25 parts of hexafluoroisopropyl methacrylate, 5 parts of N-vinyl pyrrolidone, 5 parts of methacrylic acid and 5 parts of ethylene glycol dimethacrylate, was employed.

Further, helium, argon and nitrogen gas used, were respectively, passed through a concentrated pyrogallol solution as an oxygen absorber and then through a silica gel column for drying.

Then, CL-A, CL-B or CL-C was subjected to glow discharge treatment under the conditions as identified in Table 1, and the change in the contact angle before and after the treatment was examined. The results are shown in Table 1.

0.8 Torr) under such condition that the output was 50 W and the glow discharge time was 15 minutes, and the change in the contact angle before and after the treatment was examined. The results are in Table 2.

Then, the surface condition of the contact lens before and after the treatment was observed by a microscope (20 magnifications). Further, while fixing the peripheral portion of the contact lens, a penetrating needle having a forward end diameter of 2 mm (2 R) was pressed against the center of the lens, and the load (kg) at the time of the breakage of the contact lens was measured, whereby a value obtained by dividing the load by the thickness at the center of the lens, was taken as the lens strength. The results are shown also in Table 2.

TABLE 2

| | Type of gas | Contact angle (degree) | | Surface condition of lens | | Lens strength (kg/mm) | |
|---|---|---|---|---|---|---|---|
| | | Before treatment | After treatment | Before treatment | After treatment | Before treatment | After treatment |
| Test No. | | | | | | | |
| 1 | He | 104 | 32 | Good* | No change | 8.0 | 7.6 |
| 2 | Ar | 104 | 34 | Good* | No change | 8.0 | 7.2 |
| 3 | $N_2$ | 104 | 31 | Good* | No change | 8.0 | 7.4 |
| Comparative Test No. 1 | $O_2$ | 104 | 31 | Good* | Fine cracks formed | 8.0 | 0.4 |

*Smooth surface with no cracks or scratches

From the results of Tables 1 and 2, it is apparent that according to the method for treating the surface of an oxygen permeable hard contact lens of the present invention, hydrophilic properties can be given to the

TABLE 1

| Test No. | Type of lens | Type of gas | Pressure of gas atmosphere (Torr) | Output (W) | Glow discharge time | Contact angle (degrees) | |
|---|---|---|---|---|---|---|---|
| | | | | | | Before treatment | After treatment |
| 1 | CL-A | $N_2$ | 0.8 | 50 | 10 sec. | 101 | 67 |
| 2 | CL-A | $N_2$ | 0.8 | 50 | 3 min. | 101 | 27 |
| 3 | CL-A | $N_2$ | 0.8 | 50 | 15 min. | 101 | 31 |
| 4 | CL-B | $N_2$ | 0.8 | 50 | 10 sec. | 100 | 75 |
| 5 | CL-B | $N_2$ | 0.8 | 50 | 3 min. | 100 | 30 |
| 6 | CL-B | $N_2$ | 0.8 | 50 | 15 min. | 100 | 32 |
| 7 | CL-C | $N_2$ | 0.8 | 50 | 10 sec. | 104 | 78 |
| 8 | CL-C | $N_2$ | 0.8 | 50 | 3 min. | 104 | 30 |
| 9 | CL-C | $N_2$ | 0.8 | 50 | 15 min. | 104 | 31 |
| 10 | CL-A | He | 0.8 | 50 | 10 sec. | 101 | 69 |
| 11 | CL-A | He | 0.8 | 50 | 3 min. | 101 | 40 |
| 12 | CL-A | He | 0.8 | 50 | 10 min. | 101 | 36 |
| 13 | CL-B | He | 0.8 | 50 | 10 sec. | 100 | 72 |
| 14 | CL-B | He | 0.8 | 50 | 3 min. | 100 | 33 |
| 15 | CL-B | He | 0.8 | 50 | 10 min. | 100 | 38 |
| 16 | CL-C | He | 0.8 | 50 | 10 sec. | 104 | 64 |
| 17 | CL-C | He | 0.8 | 50 | 3 min. | 104 | 32 |
| 18 | CL-C | He | 0.8 | 50 | 10 min. | 104 | 38 |
| 19 | CL-A | Ar | 0.8 | 50 | 10 sec. | 101 | 66 |
| 20 | CL-A | Ar | 0.8 | 50 | 3 min. | 101 | 36 |
| 21 | CL-A | Ar | 0.8 | 50 | 15 min. | 101 | 36 |
| 22 | CL-B | Ar | 0.8 | 50 | 10 sec. | 100 | 76 |
| 23 | CL-B | Ar | 0.8 | 50 | 3 min. | 100 | 35 |
| 24 | CL-B | Ar | 0.8 | 50 | 15 min. | 100 | 36 |
| 25 | CL-C | Ar | 0.8 | 50 | 10 sec. | 104 | 80 |
| 26 | CL-C | Ar | 0.8 | 50 | 3 min. | 104 | 33 |
| 27 | CL-C | Ar | 0.8 | 50 | 15 min. | 104 | 34 |
| 28 | CL-B | Ar | 1.2 | 50 | 5 min. | 100 | 35 |

EXAMPLE 2

As the contact lens, CL-C was used, and with respect to helium, argon and nitrogen gas used, the same treatment as in Example 1 was applied so that the gas used, contained substantially no oxygen. The glow discharge treatment was applied in the same manner as in Example 1 in the gas atmosphere as identified in Table 2 (provided that the pressure of the gas atmosphere was surface of the contact lens without lowering the oxygen permeability and the hardness of the contact lens.

Thus, the method for treating the surface of an oxygen permeable hard contact lens of the present invention provides an effect of giving water-wetting properties to the surface while maintaining the oxygen permeability and the hardness without bringing about a deterioration of the material of the contact lens.

What is claimed is:

1. A method for treating the surface of an oxygen permeable hard contact lens, which comprises applying high-frequency glow discharge treatment to an oxygen permeable hard contact lens made of a copolymer consisting essentially of a silicone-containing (meth)acrylate and/or a fluorine-containing (meth)acrylate, in a gas atmosphere of at least one member selected from the group consisting of helium, neon, argon and nitrogen gas, containing substantially no oxygen.

2. The method according to claim 1, wherein the gas atmosphere is made of at least one member selected from the group consisting of helium, neon and argon.

3. The method according to claim 1, wherein the gas atmosphere has a pressure within a range of from 0.01 to 5.0 Torr.

4. The method according to claim 1, wherein the high-frequency glow discharge treatment is conducted with a frequency of about 13.56 MHz.

5. The method according to claim 1, wherein the high-frequency glow discharge treatment is conducted at a discharge output of from 10 to 1,000 W for from 10 seconds to 20 minutes.

* * * * *